US009149399B2

(12) United States Patent
Segawa et al.

(10) Patent No.: US 9,149,399 B2
(45) Date of Patent: Oct. 6, 2015

(54) STAIR CLIMBING VEHICLE

(71) Applicant: JTEKT CORPORATION, Osaka-shi (JP)

(72) Inventors: Masaya Segawa, Nara (JP); Motoki Shino, Kashiwa (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/468,888

(22) Filed: Aug. 26, 2014

(65) Prior Publication Data

US 2015/0061240 A1 Mar. 5, 2015

(30) Foreign Application Priority Data

Sep. 2, 2013 (JP) ................. 2013-181665

(51) Int. Cl.
*B62B 9/02* (2006.01)
*A61G 5/06* (2006.01)
*A61G 5/10* (2006.01)
*B62D 63/04* (2006.01)
*B62B 5/02* (2006.01)

(52) U.S. Cl.
CPC ................ *A61G 5/061* (2013.01); *A61G 5/107* (2013.01); *A61G 2203/42* (2013.01); *B62B 5/02* (2013.01); *B62B 9/02* (2013.01); *B62D 63/04* (2013.01)

(58) Field of Classification Search
CPC ............ B62B 9/02; B62B 5/02; A61G 5/061; A61G 5/063; B62D 63/04
USPC ............................................ 280/5.28; 18/9.3
See application file for complete search history.

(56) References Cited

U.S. PATENT DOCUMENTS

| 5,971,091 | A  | * | 10/1999 | Kamen et al. ................. 180/218 |
| 6,553,271 | B1 | * | 4/2003  | Morrell ........................... 700/75 |
| 2002/0092686 | A1 |   | 7/2002  | Morrell et al. |
| 2002/0121394 | A1 | * | 9/2002  | Kamen et al. ................... 180/41 |
| 2014/0175762 | A1 | * | 6/2014  | Zanderlehn et al. ......... 280/5.28 |

FOREIGN PATENT DOCUMENTS

| JP | 4574016 | 11/2010 |
| JP | 4734048 | 4/2011 |

* cited by examiner

*Primary Examiner* — Joseph Rocca
*Assistant Examiner* — Marlon Arce
(74) *Attorney, Agent, or Firm* — Oblon, McClelland, Maier & Neustadt, L.L.P.

(57) ABSTRACT

A stair climbing vehicle that is able to stably climb stairs is provided. In order to keep the balance of the stair climbing vehicle at the time of climbing the stairs, the ratio between a gravity center moving control gain for the stair climbing vehicle and a turning control gain for first wheels and second wheels is changed by controlling the rotation of a first motor of each first turning actuator. Thus, it is possible to slightly turn the first wheels and the second wheels based on the posture of an occupant seated on the stair climbing vehicle when the occupant climbs the stairs with the stair climbing vehicle, thereby preventing the posture of the occupant from being unstable. Thus, the stair climbing vehicle is able to stably climb the stairs.

4 Claims, 12 Drawing Sheets

STAIR CLIMBING VEHICLE

INCORPORATION BY REFERENCE

The disclosure of Japanese Patent Application No. 2013-181665 filed on Sep. 2, 2013, including the specification, drawings and abstract, is incorporated herein by reference in its entirety.

BACKGROUND OF THE INVENTION

1. Field of the Invention

The invention relates to a stair climbing vehicle that is able to climb stairs while carrying a load such as a person or an object.

2. Description of the Related Art

For example, Japanese Patent No. 4734038 describes a stair climbing vehicle including supporting portions by which four wheels are rotatably supported, a main body portion by which the supporting portions are turnably supported, and sliding mechanisms that move the supporting portions and the main body portion relative to each other in the front-rear direction. When the stair climbing vehicle climbs up stairs with a load placed on an upper face of the main body portion, the main body portion is moved while the supporting portions are turned.

Japanese Patent No. 4574016 describes a stair climbing vehicle including supporting portions by which four wheels are rotatably supported, a main body portion by which the supporting portions are turnably supported, and a load-carrying portion that is fixed to upper portions of the supporting portions and on which a person is able to be seated. When the stair climbing vehicle climbs up stairs with a person seated on the load-carrying portion, the supporting portions and the main body portion are turned relative to each other.

When each of the stair climbing vehicles described in Japanese Patent No. 4734038 and Japanese Patent No. 4574016 climbs up stairs, the main body portion oscillates back and forth about the supporting portions. Thus, the position of a load placed on the upper face of the main body portion or the position of a person seated on the load-carrying portion may be unstable.

SUMMARY OF THE INVENTION

One object of the invention is to provide a stair climbing vehicle that is able to climb up stairs stably.

A stair climbing vehicle according to an aspect of the invention includes:
  a main body portion;
  a supporting portion that is disposed at a lower portion of the main body portion and that supports the main body portion, the supporting portion being relatively turnable around a support shaft with respect to the main body portion;
  a supporting portion turning angle detection sensor that detects a relative turning angle of the supporting portion with respect to the main body portion;
  a first wheel and a second wheel that are supported at the supporting portion so as to be rotatable about respective axles parallel to the support shaft, the first wheel and the second wheel being disposed such that the first wheel and the second wheel are allowed to revolve, at different positions, with respect to the support shaft by turning the supporting portion with respect to the main body portion;
  a wheel turning angle sensor that detects a relative turning angle of each of the first wheel and the second wheel with respect to the supporting portion;
  a first turning actuator that relatively turns the first wheel and the second wheel, with respect to the supporting portion, around the axle of the first wheel and the axle of the second wheel;
  a second turning actuator that turns the main body portion around the support shaft with respect to the supporting portion;
  a load-carrying portion that is disposed on an upper portion of the main body portion, and on which a load is placed;
  a changing actuator that relatively changes a position of the load-carrying portion with respect to the main body portion;
  a controller that drives the changing actuator to change the position of the load-carrying portion with respect to the main body portion and that drives the first and second turning actuators to turn the supporting portion with respect to the main body portion, thereby alternately landing the first wheel and the second wheel on steps of stairs to cause the stair climbing vehicle to climb the stairs, and
  a sensor that detects a gradient of the main body portion or the load-carrying portion.
The controller includes:
  a gravity center moving control unit that executes feedback control on movement of a center of gravity of the stair climbing vehicle based on a sensor signal from the sensor that detects the gradient;
  a turning control unit that executes feedback control on turning of the first wheel and the second wheel based on a sensor signal from the wheel turning angle sensor; and
  a gain ratio setting unit that sets a ratio between a control gain of the gravity center moving control unit and a control gain of the turning control unit based on a sensor signal from the supporting portion turning angle detection sensor.
The controller drives the first turning actuator based on the ratio between the control gains.

Thus, when the stair climbing vehicle climbs up the stairs, the first wheel and the second wheel are slightly turned based on the turning position of the supporting portion with respect to the main body portion. Thus, it is possible to prevent the posture of the load from being unstable. As a result, the stair climbing vehicle is able to stably climb up the stairs. In addition, when climbing down the stairs, the stair climbing vehicle is able to climb down the stairs stably.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, a stair climbing vehicle 1 according to an embodiment of the invention will be described with reference to FIG. 1 to FIG. 4. In the following description, the stair climbing vehicle 1 according to the present embodiment is applied to a wheelchair in which a person is seated. Alternatively, the stair climbing vehicle 1 according to the present embodiment may be applied to a vehicle that is loaded with an object and that carries the object. In the invention, a person and an object will be collectively referred to as "load". Note that, in the following description, "forward direction" and "rearward direction" refer to directions of travel of the stair climbing vehicle 1, and "rightward direction" and "leftward direction" refer to directions perpendicular, on a horizontal plane, to the direction of travel when the stair climbing vehicle 1 is viewed from the rear side.

Figure 1:
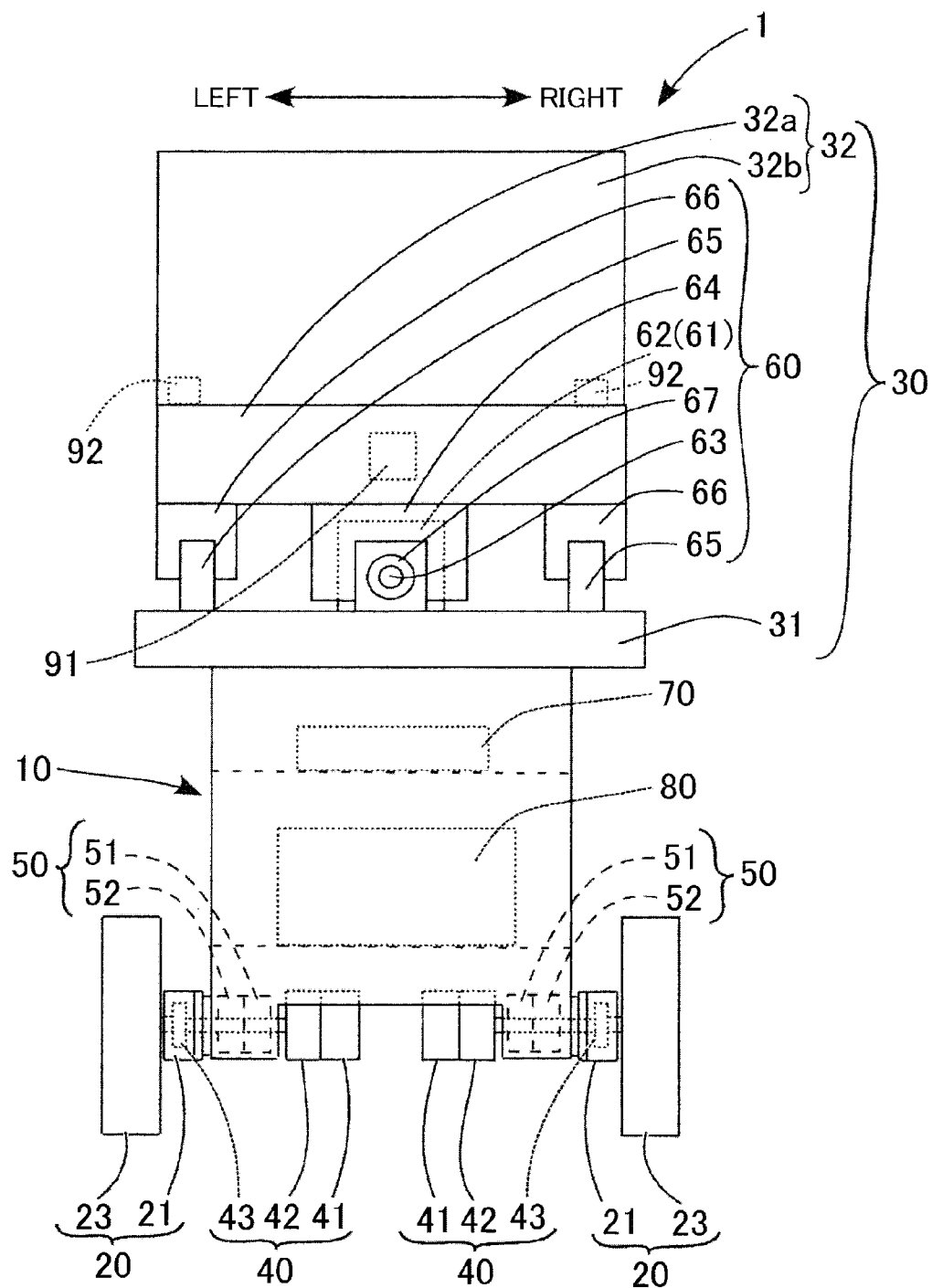
FIG. 1 is a view illustrating a stair climbing vehicle according to an embodiment of the invention, as viewed from the rear side.
Figure 2:
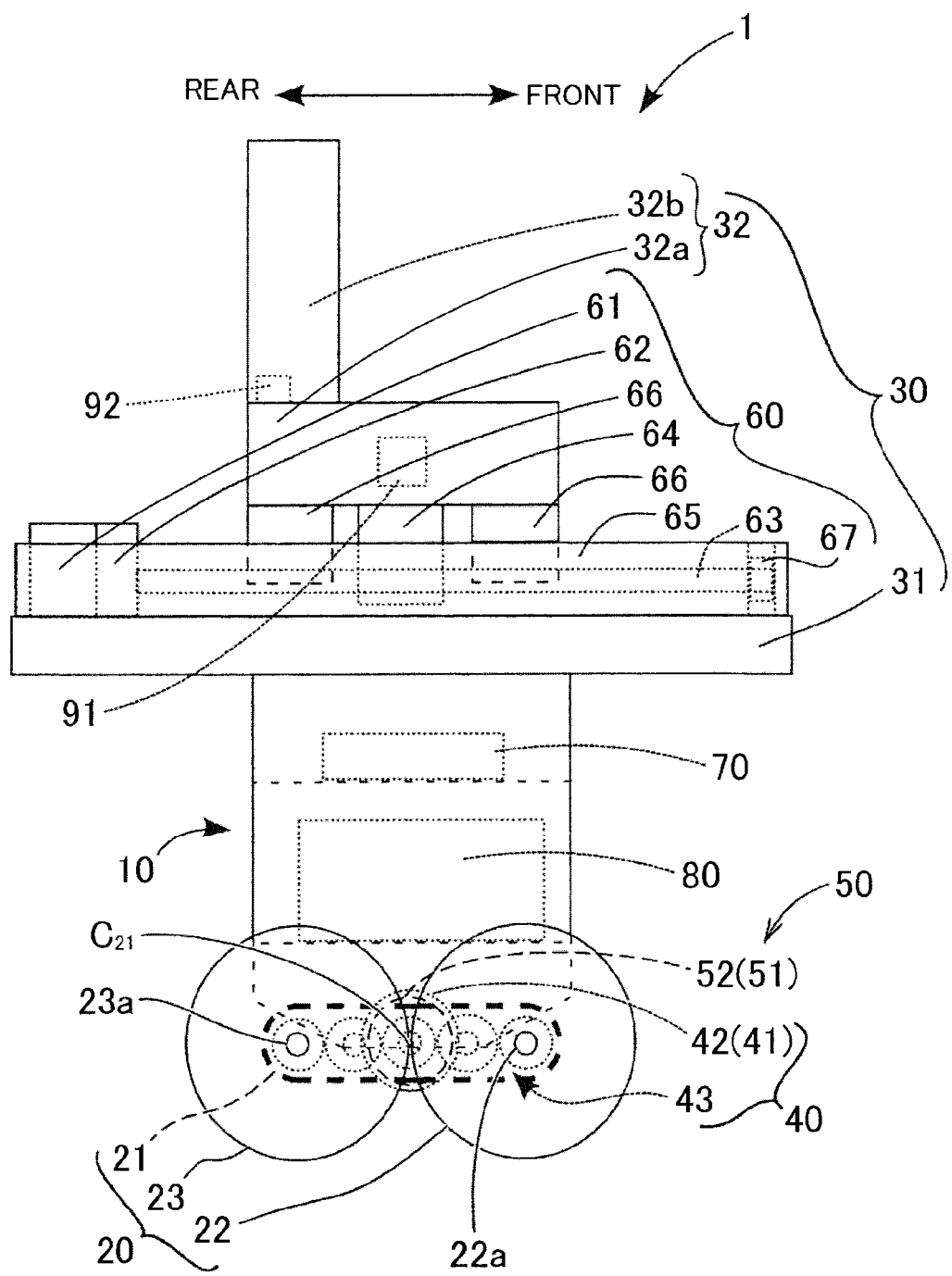
FIG. 2 is a view illustrating the stair climbing vehicle as viewed from the right side.
Figure 3:
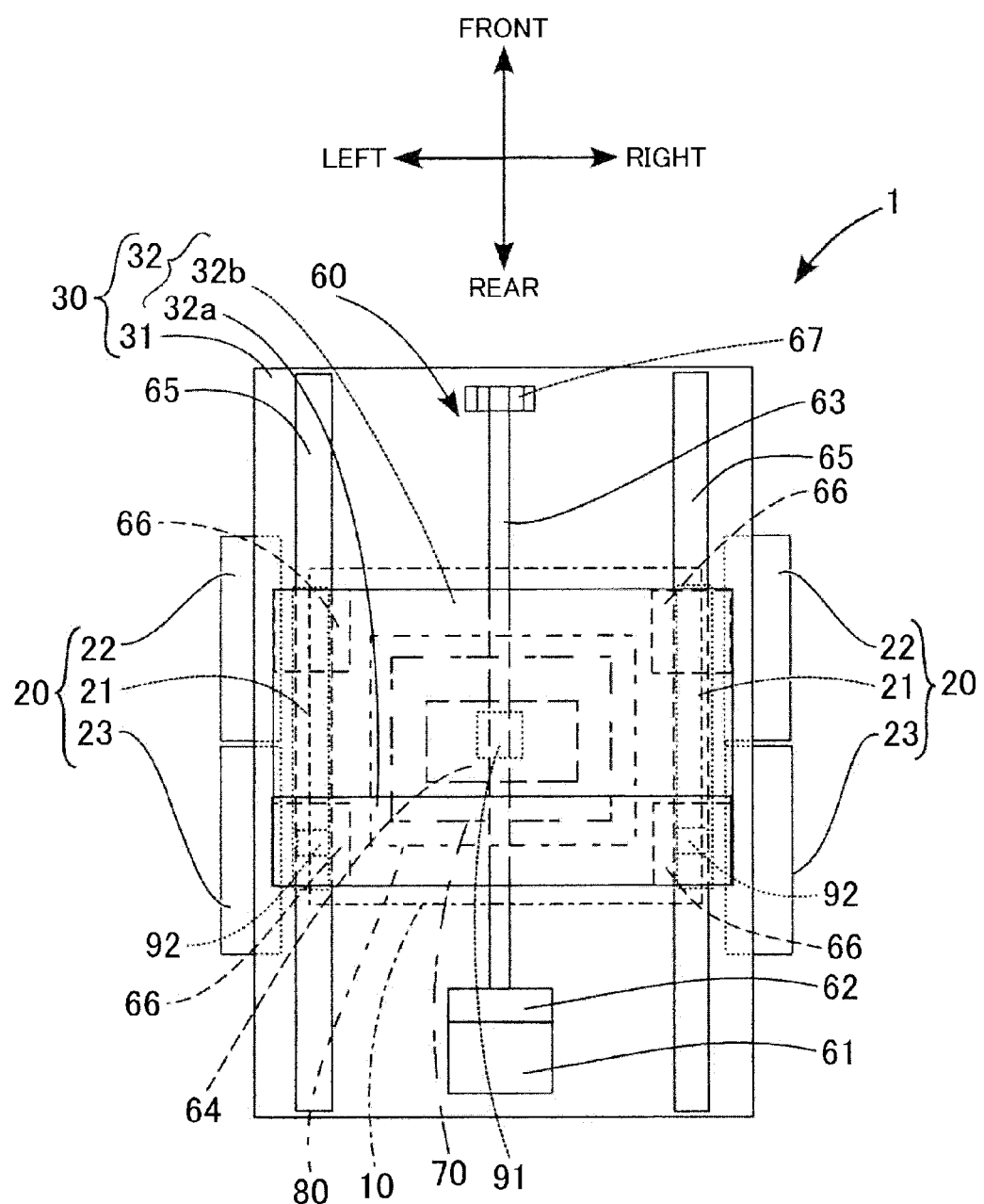
FIG. 3 is a view illustrating the stair climbing vehicle as viewed from above.

As illustrated in FIG. 1 to FIG. 3, the stair climbing vehicle 1 includes, for example, a main body portion 10, travelling portions 20, and a load-carrying portion 30. The main body portion 10 is formed into a rectangular parallelepiped shape by, for example, a frame member. The travelling portions 20 are disposed at a lower portion of the main body portion 10, and the load-carrying portion 30 is disposed on an upper portion of the main body portion 10. The travelling portions 20 include a pair of supporting portions 21, a pair of first wheels 22, and a pair of second wheels 23. The travelling portions 20, each including one supporting portion 21, one first wheel 22 and one second wheel 23, are disposed respectively on the right side and the left side of the main body portion 10. Note that, the position of the first wheels 22 and the position of the second wheels 23 are inverted in the travelling direction in some cases. Therefore, in the following description, "front wheel" refers to a wheel located on the front side in the travelling direction and "rear wheel" refers to a wheel located on the rear side in the travelling direction.

The supporting portions 21 are disposed respectively on the right side and the left side of the main body portion 10, and are each formed into a generally rectangular parallelepiped shape and a hollow shape so as to extend in the front-rear direction. The supporting portions 21 support the main body portion 10, and the supporting portions 21 are relatively turnable around a support shaft $C_{21}$ (illustrated in FIG. 2) with respect to the main body portion 10. The first wheel 22 and the second wheel 23 are supported at opposite ends of the supporting portion 21, more specifically, the opposite ends of the supporting portion 21 in the right-left direction of the sheet on which FIG. 2 is drawn, so as to be rotatable about an axle 22a and an axle 23a (illustrated in FIG. 2), respectively. The directions in which the first wheel 22 and the second wheel 23 are turned with respect to the supporting portion 21 are the same as the direction in which the main body portion 10 is turned with respect to the supporting portion 21. That is, the axle 22a of the first wheel 22 and the axle 23a of the second wheel 23 are parallel to the support shaft $C_{21}$. In a case where the supporting portion 21 is turned around the support shaft $C_{21}$ with respect to the main body portion 10, the first wheel 22 and the second wheel 23 revolve about the support shaft $C_{21}$.

The load-carrying portion 30 includes, for example, a base 31 that is in the form of a rectangular plate and that is fixedly disposed on the upper portion of the main body portion 10, and a moving actuator 60 that moves a chair 32 in the front-rear direction parallel to an upper face of the base 31. The moving actuator 60 is disposed on the base 31. A person is able to be seated in the chair 32. The moving actuator 60 may function as a changing actuator in the invention. The moving actuator 60 includes a motor 61 for moving the chair 32 (hereinafter, referred to as "moving motor 61"), a speed reducer 62 for moving the chair 32 (hereinafter, referred to as "moving speed reducer 62"), a feed screw member 63, a nut member 64, a pair of guide rails 65, and two pairs of sliders 66.

The moving motor 61 and the moving speed reducer 62 are fixed at the center of a rear portion of the base 31 such that a motor shaft (not illustrated) and an output shaft (not illustrated) extend forward. The motor shaft of the moving motor 61 is connected to the moving speed reducer 62, and the output shaft of the moving speed reducer 62 is connected to a rear end of the feed screw member 63. A front end of the feed screw member 63 is fitted in a bearing 67 fixed at the center of a front portion of the base 31. The nut member 64 is screwed to the feed screw member 63, and is fixed to the center of a lower face of the chair 32. The guide rails 65 are disposed on the base 31 at positions on the opposite sides of the feed screw member 63 so as to extend parallel to each other in the front-rear direction. Each pair of the sliders 66 is slidable along a corresponding one of the guide rails 65. The four sliders 66 (two pairs of sliders 66) are fixed respectively to four corners of the lower face of the chair 32.

Figure 4:
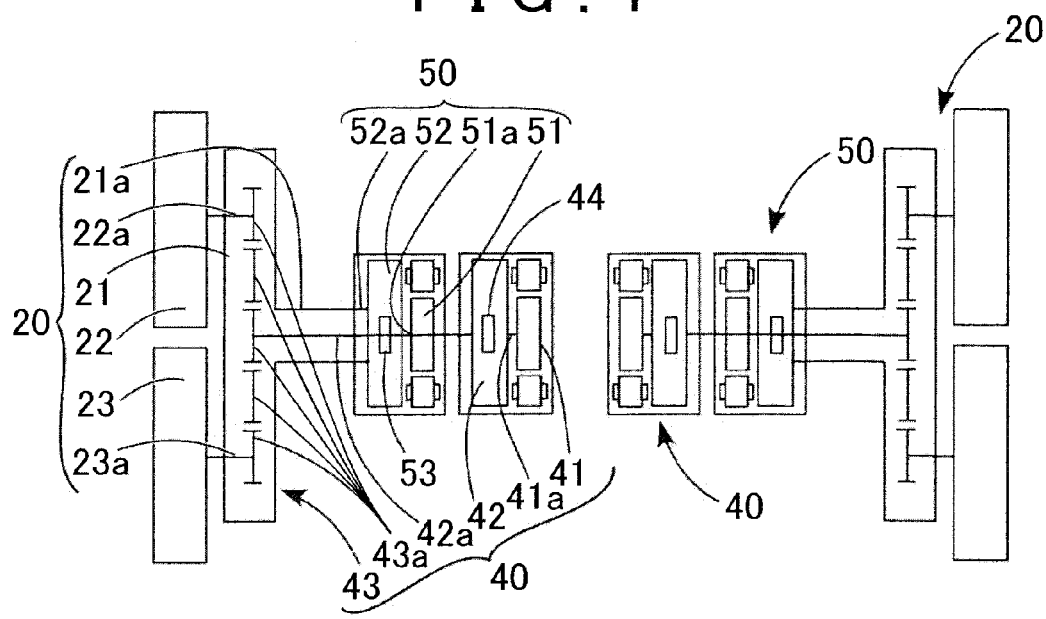
FIG. 4 is a schematic diagram illustrating first and second turning actuators of the stair climbing vehicle.

As illustrated in FIG. 1 and FIG. 2, the main body portion 10 is provided with a pair of first turning actuators 40. One of the first turning actuators 40 is disposed on the right side of the main body portion 10, and the other one of the first turning actuators 40 is disposed on the left side of the main body portion 10. The first turning actuators 40 relatively turn the first wheels 22 and the second wheels 23 of the travelling portions 20, with respect to the supporting portions 21, around the axles 22a and the axles 23a. As illustrated in FIG. 4, each first turning actuator 40 includes, for example, a first motor 41, a first speed reducer 42, a gear train 43, and a wheel turning angle sensor 44.

As illustrated in FIG. 4, each gear train 43 includes five spur gears 43a meshed with each other and arranged side by side, and is turnably supported in the supporting portion 21. A motor shaft 41a of the first motor 41 disposed in the main body portion 10 is connected to the first speed reducer 42 disposed in the main body portion 10. A hollow shaft 21a is formed integrally with the supporting portion 21, and protrudes from the center of the supporting portion 21. An output shaft 42a of the first speed reducer 42 is disposed so as to pass through the hollow shaft 21a.

The spur gear 43a disposed at the center of the gear train 43 is fitted to the output shaft 42a of the first speed reducer 42. The spur gears 43a disposed at the opposite ends of the gear train 43 are fitted to the axle 22a of the first wheel 22 and the axle 23a of the second wheel 23, respectively. The hollow shaft 21a of each supporting portion 21 is fitted to the lower portion of the main body portion 10 via a bearing (not illustrated) such that the main body portion 10 and the supporting portion 21 are turnable relative to each other. The turning angle of each of the first wheel 22 and the second wheel 23 with respect to the supporting portion 21 is detected based on, for example, a sensor signal from the wheel turning angle sensor 44, a rotation speed of the first motor 41, a reduction ratio of the first speed reducer 42 and the gear ratio of the gear train 43.

As illustrated in FIG. 1 and FIG. 4, there is provided a pair of second turning actuators 50. The second turning actuators 50 are respectively arranged on the right side and the left side within the main body portion 10. Each second turning actuator 50 is disposed between the corresponding supporting portion 21, and the first motor 41 and the first speed reducer 42 of the corresponding first turning actuator 40. The second turning actuator 50 turns supporting portion 21 around the support shaft $C_{21}$ with respect to the main body portion 10. Each second turning actuator 50 includes, for example, a second motor 51, a second speed reducer 52, and a supporting portion turning angle detection sensor 53. A motor shaft 51a of the second motor 51 disposed in the main body portion 10 is connected to the second speed reducer 52 disposed in the main body portion 10. An output shaft 52a of the second speed reducer 52 is connected to the hollow shaft 21a of the supporting portion 21. The turning angle of the supporting portion 21 with respect the main body portion 10 is detected based on, for example, a sensor signal from the supporting portion turning angle detection sensor 53, the rotation speed of the second motor 51 and the speed reduction ratio of the second speed reducer 52.

Further, as illustrated in FIG. 1 to FIG. 3, a controller 70 that controls operations of, for example, the first turning actuator 40, the second turning actuator 50 and the moving actuator 60, a drive battery 80 that supplies electric power to, for example, the actuators 40, 50, 60 are fixedly disposed in the main body portion 10. And a gyro sensor 91 are fixedly disposed in the load-carrying portion 30. The gyro sensor 91 is an example of a sensor that detects a gradient of the main body portion or the load-carrying portion of the stair climbing vehicle 1. Posture detection sensors 92 are disposed so as to be located on both a seating face 32a and a backrest 32b of the chair 32 of the load-carrying portion 30, or located on one of the seating face 32a and the backrest 32b. Each posture detection sensor 92 detects a torque (load) that is generated between the seating face 32a and the backrest 32b when a person seated in the chair 32 (hereinafter, referred to as "occupant") leans against the backrest 32b. The posture detection sensor 92 may be a sensor that detects a distortion generated between the seating face 32a and the backrest 32b. When the stair climbing vehicle 1 is climbing up the stairs with the occupant seated in the chair 32, usually the occupant's back is supported by the backrest 32b. Therefore, with the provision of the posture detection sensors 92, it is possible to provide the occupant with a sense of security, thus making it possible for the stair climbing vehicle 1 to stably climb up the stairs.

Figure 5:
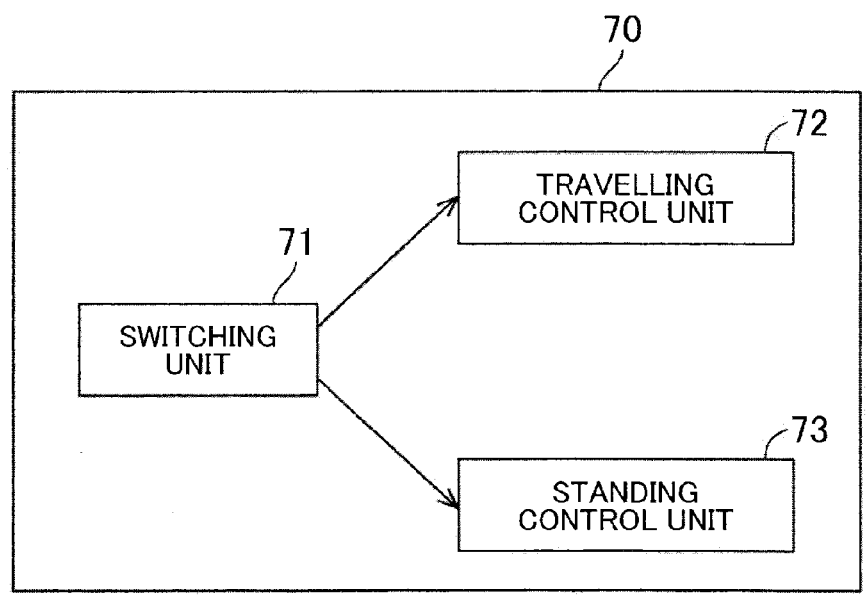
FIG. 5 is a functional block diagram of a controller of the stair climbing vehicle in FIG. 1.

Next, the configuration of the controller 70 will be described with reference to FIG. 5. As illustrated in FIG. 5, the controller 70 includes a switching unit 71, a travelling control unit 72, and a standing control unit 73. The switching unit 71 makes switchover between control by the travelling control unit 72 and control by the standing control unit 73, depending on the state of the stair climbing vehicle 1. The details of the process executed by the switching unit 71 will be described later. Although the travelling control unit 72 and the standing control unit 73 will be briefly described below, they will be described in detail later along with the description of an operation of the stair climbing vehicle 1.

The travelling control unit 72 controls travelling of the stair climbing vehicle 1 in a state where the first wheels 22 and the second wheels 23 are in contact with the travelling surface, and controls the posture of the load-carrying portion 30 on the condition that the supporting portions 21 are not turned with respect to the travelling surface and the angle of the supporting portions 21 with respect to the travelling surface is maintained constant. In a standing state achieved by the front wheels, the standing control unit 73 executes stair climbing control and controls the posture of the load-carrying portion 30 on the condition that the front wheels are positioned. That is, the standing control unit 73 controls a state where one of the first wheels 22 and the second wheels 23 serves as revolving wheels that revolves around the axles of the other one of the first wheels 22 and the second wheels 23.

Figure 6:
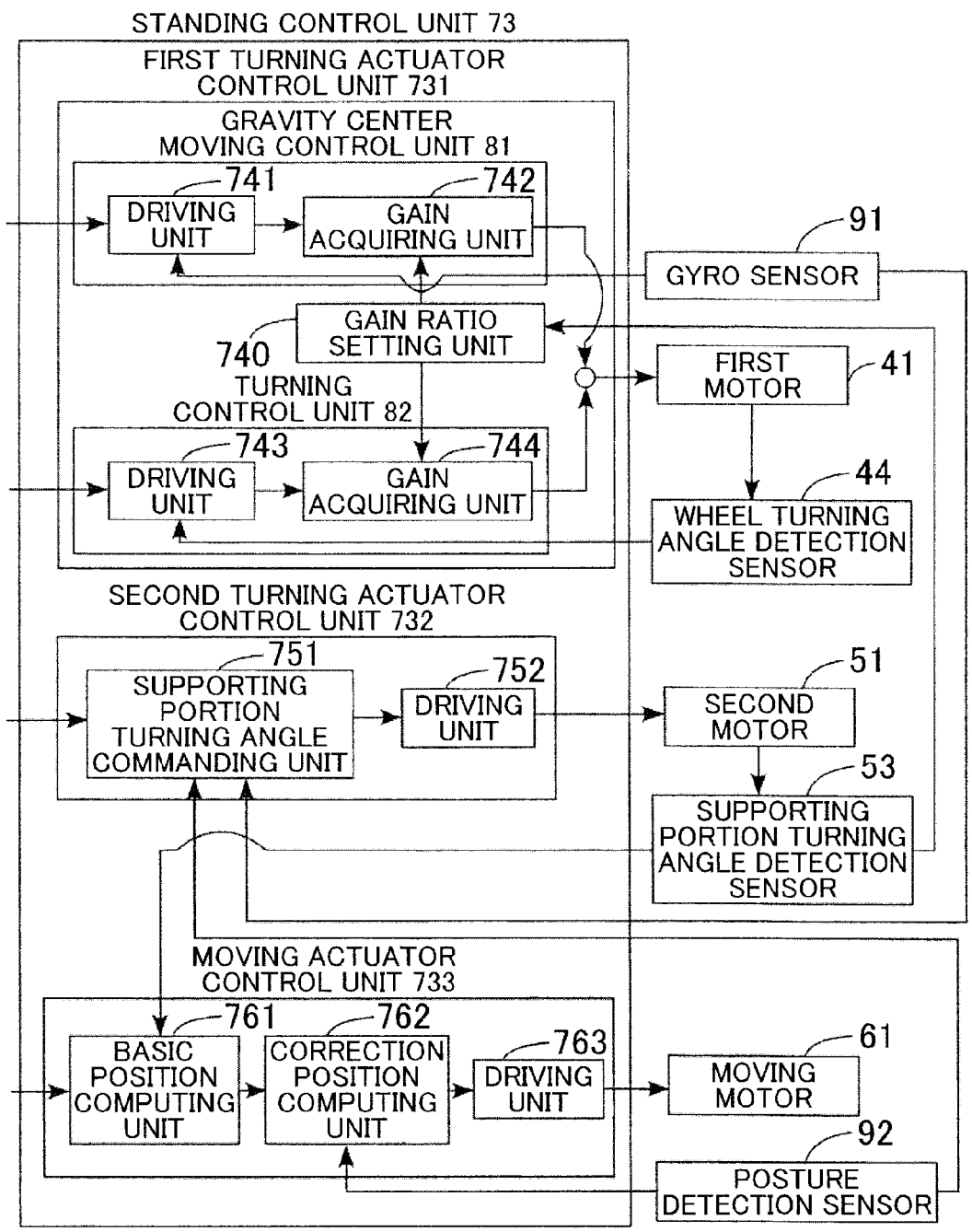
FIG. 6 is a functional block diagram of a standing control unit in FIG. 5.

Next, the detailed configuration of the standing control unit 73 will be described with reference to FIG. 6. As illustrated in FIG. 6, the standing control unit 73 includes a first turning actuator control unit 731, a second turning actuator control unit 732, and a moving actuator control unit 733. The first turning actuator control unit 731 includes a gain ratio setting unit 740, a gravity center moving control unit 81 including a driving unit 741 and a gain acquiring unit 742, and a turning control unit 82 including a driving unit 743 and a gain acquiring unit 744. The second turning actuator control unit 732 includes a supporting portion turning angle commanding unit 751 and a driving unit 752. The moving actuator control unit 733 includes a basic position computing unit 761, a correction position computing unit 762 and a driving unit 763.

The first turning actuator control unit 731 controls the rotation of each first motor 41. Specifically, the gain ratio setting unit 740 sets the ratio between a control gain of the gravity center moving control unit 81 and a control gain of the turning control unit 82 based on sensor signals from the supporting portion turning angle detection sensors 53 in order to keep the balance of the stair climbing vehicle 1. Then, the gain ratio setting unit 740 transmits the control gains respectively to the gain acquiring unit 742 of the gravity center moving control unit 81 and the gain acquiring unit 744 of the turning control unit 82. Thus, it is possible to set the ratio between the gain of the gravity center moving control and the gain of the turning control to an appropriate value, based on the turning positions of the supporting portions 21 with respect to the main body portion 10. As a result, the stair climbing vehicle 1 is able to climb up the stairs stably.

The driving unit 741 of the gravity center moving control unit 81 transmits a current command to the gain acquiring unit 742, based on a sensor signal from the gyro sensor 91. The driving unit 743 of the turning control unit 82 transmits a current command to the gain acquiring unit 744, based on sensor signals from the wheel turning angle sensors 44. In this way, feedback control based on the gyro sensor signal and the wheel turning angle signals is executed. Thus, it is possible to accurately execute the gravity center moving control and the turning control based on the turning positions of the supporting portions 21 with respect to the main body portion 10.

The gain acquiring unit 742 of the gravity center moving control unit 81 changes the current command received from the driving unit 741 based on the ratio of the control gain received from the gain ratio setting unit 740, and controls the rotation of each first motor 41 based on the changed current command. The gain acquiring unit 744 of the turning control unit 82 changes the current command received from the driving unit 743 based on the ratio of the control gain received from the gain ratio setting unit 740, and controls the rotation of each first motor 41 based on the changed current command.

The second turning actuator control unit 732 controls the rotation of each second motor 51. Specifically, the supporting portion turning angle commanding unit 751 transmits a turning angle command for the supporting portions 21 to the driving unit 752. The driving unit 752 controls the rotation of each second motor 51 based on the rotation angle command for the supporting portions 21, received from the supporting portion turning angle commanding unit 751. Upon reception of sensor signals from the posture detection sensors 92, the second turning actuator control unit 732 may restrict the control based on a center of gravity of the stair climbing vehicle 1 according to the sensor signal from the gyro sensor 91. Thus, when the occupant is climbing up the stairs while moving the stair climbing vehicle 1 forward, it is possible to prevent unintentional rearward movement of the stair climbing vehicle 1 when the occupant applies a load on the backrest 32b. Thus, the stair climbing vehicle 1 is able to stably climb up the stairs.

The moving actuator control unit 733 controls the rotation of the moving motor 61. Specifically, the basic position computing unit 761 computes a basic position of the chair 32 with respect to the main body portion 10 from the position of the chair 32 with respect to the main body portion 10 when no occupant is seated in the chair 32 of the load-carrying portion 30 and the position of the chair 32 with respect to the main body portion 10 when an occupant is seated in the chair 32, based on the sensor signals from the supporting portion turning angle detection sensor 53. Then the basic position computing unit 761 transmits the basic position of the chair 32 to the correction position computing unit 762. The position of the chair 32 with respect to the main body portion 10 is adjusted to keep the balance of the stair climbing vehicle 1. Thus, irrespective of who is seated in the chair 32, it is possible to accurately determine the position of the chair 32, at which the balance of the stair climbing vehicle 1 is kept. Thus, the stair climbing vehicle 1 is able to stably climb up the stairs.

The correction position computing unit 762 computes a correction position of the chair 32 with respect to the main body portion 10 based on the sensor signals from the posture detection sensors 92, and transmits a corrected moving command obtained by correcting the basic position, which is received from the basic position computing unit 761, with the correction position, to the driving unit 763. The driving unit 763 controls the rotation of the moving motor 61 based on a corrected moving command for the chair 32, which is received from the correction position computing unit 762. When the sensor signal from each posture detection sensor 92 is detected, the correction position computing unit 762 sets a balance point (target position) of the center of gravity of the stair climbing vehicle 1 to a position closer to the wall surface of a step. Thus, the center of gravity of the stair climbing vehicle 1, on which an occupant is seated, moves in the direction in which the stair climbing vehicle 1 is climbing up the stairs (in the forward direction). Thus, the stair climbing vehicle 1 is able to stably climb up the stairs.

Next, the switching process executed by the switching unit 71 of the controller 70, the standing control process executed by the standing control unit 73, and the stair climbing operation performed by the stair climbing vehicle 1 will be described with reference to FIG. 7, FIG. 8, and FIG. 9A to FIG. 9G. Description will be provided on an operation in which the stair climbing vehicle 1, which is located on a horizontal travelling step surface Sd (hereinafter, referred to as "travelling surface Sd") of the stairs, climbs up onto a step surface Su1 of a first step and a step surface Su2 of a second step under the control of the controller 70. Note that, in FIG. 9A to FIG. 9G, the main body portion 10, the travelling portion 20, and the load-carrying portion 30 of the stair climbing vehicle 1 are illustrated in simplified skeleton diagrams.

Figure 7:
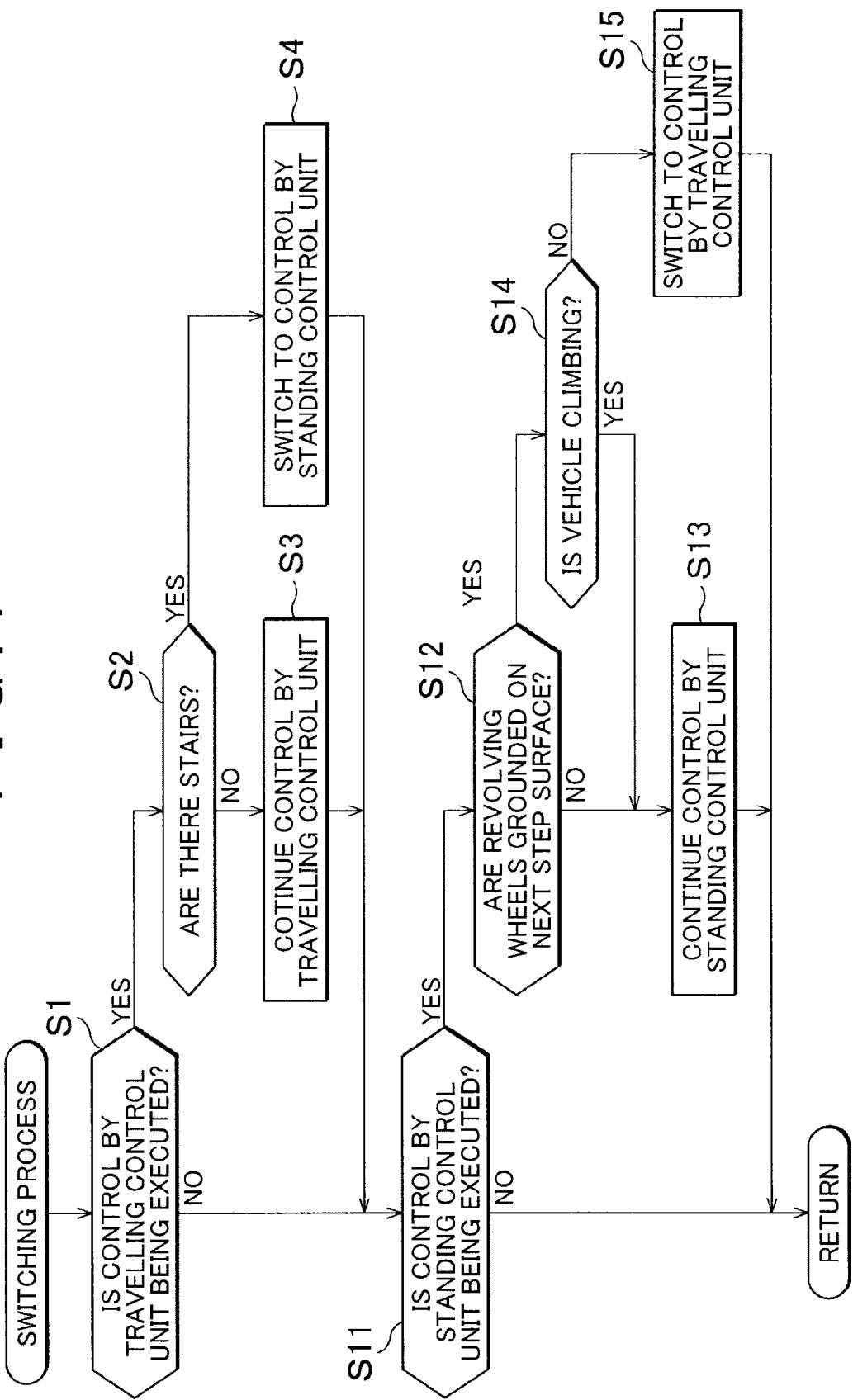
FIG. 7 is a flowchart illustrating a process executed by a switching unit in FIG. 5.

First, the process executed by the switching unit 71 will be described. As illustrated in FIG. 7, the switching unit 71 determines whether the control by the travelling control unit 72 is being executed (S1). When the control by the travelling control unit 72 is being executed (YES in S1), the switching unit 71 determines whether there are stairs (S2). When there are no stairs (NO in S2), the four-wheel travelling control in FIG. 9A, which is executed by the travelling control unit 72, is continued (S3).

Figure 9A:
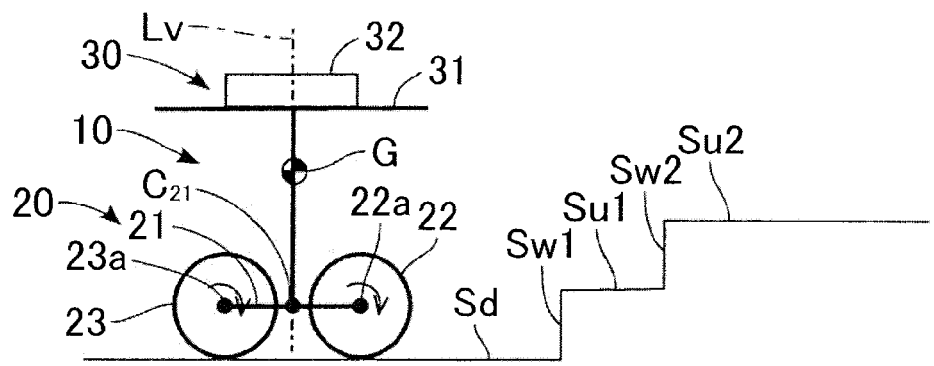
FIG. 9A is a view illustrating a state where the stair climbing vehicle is travelling under the control by a travelling control unit.

As illustrated in FIG. 9A, the stair climbing vehicle 1 is travelling from the left side to the right side in FIG. 9A, in a travelling posture at which a resultant center of gravity G of the stair climbing vehicle 1 and a person (not illustrated) seated in the chair 32 (hereinafter, referred to as "occupant") is located on a vertical line Lv that extends in the vertical direction from the support shaft $C_{21}$. Specifically, in order to make the stair climbing vehicle 1 to travel, the travelling control unit 72 rotates the first wheels 22 and the second wheels 23 in the forward travelling direction (clockwise in FIG. 9A) by controlling the rotation of each first motor 41 on the condition that the supporting portions 21 are maintained at a prescribed angle with respect to the travelling surface Sd without turning the supporting portions 21 with respect to the travelling surface S2. Thus, the first wheels 22 and the second wheels 23 rotate in the forward travelling direction with respect to the travelling surface S2, and thus the stair climbing vehicle 1 moves forward.

The travelling control unit 72 controls the postures of the main body portion 10 and the load-carrying portion 30 based on a detection signal from the gyro sensor 91. That is, the travelling control unit 72 controls the rotation of the moving motor 61 based on the detection signal from the gyro sensor 91 such that the resultant center of gravity G is located on the vertical line Lv extending from the support shaft $C_{21}$.

Note that, the resultant center of gravity G is the resultant of the center of gravity of the stair climbing vehicle 1 itself except the chair 32, which is acquired in advance, and the center of gravity of the occupant and the chair 32. The center of gravity of the occupant can be calculated from a value detected by the gyro sensor 91. That is, the travelling control unit 72 calculates the resultant center of gravity G on the basis of the value detected by the gyro sensor 91. As illustrated in FIG. 9A, the resultant center of gravity G is located on the vertical line Lv extending from the support shaft $C_{21}$ when the main body portion 10 is in the vertical state and the chair 32 of the load-carrying portion 30, in which the occupant is seated, (hereinafter, simply referred to as "chair 32") is located at substantially the center of the base 31. In the following description, the position of the chair 32 will be referred to as "origin position".

Figure 9B:
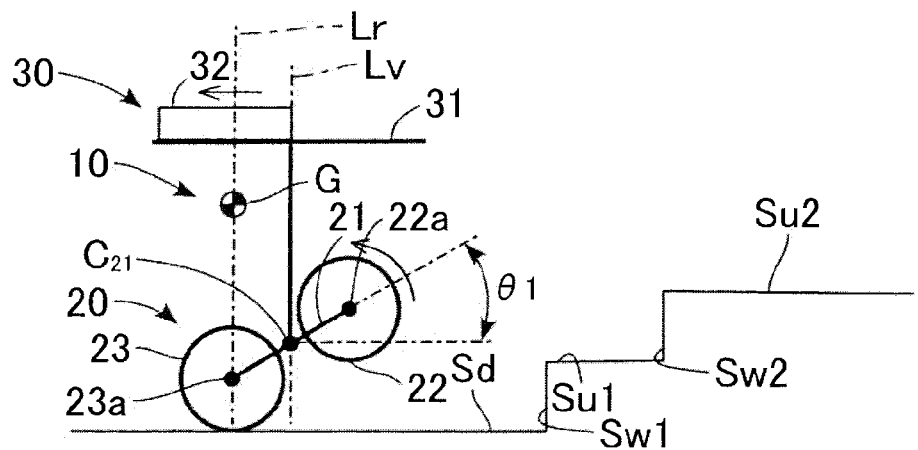
FIG. 9B is a view illustrating a state where front wheels of the stair climbing vehicle are lifted up, and illustrating a state when the control is switched to the control by the standing control unit.
Figure 9C:
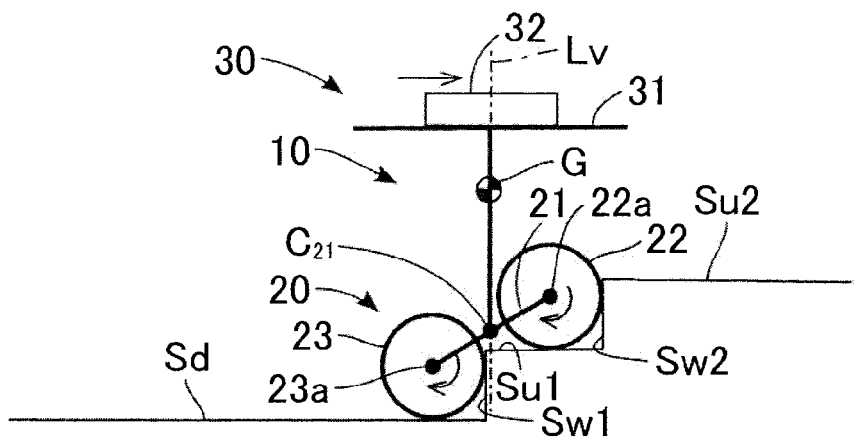
FIG. 9C is a view illustrating a state achieved next to the state in FIG. 9B, and illustrating a state where the front wheels of the stair climbing vehicle are in contact with the wall surface of a second step and a load-carrying portion (a resultant center of gravity) is moving forward.

On the other hand, when there are stairs (YES in S2), the switching unit 71 switches the control to the control executed by the standing control unit 73 (S4) to prepare for the standing control. That is, as illustrated in FIG. 9B, the standing control unit 73 lifts up the first wheels 22 by a distance between the travelling surface Sd and the step surface Su1 of the first step, that is, a step height, and then moves the stair climbing vehicle 1 forward as illustrated in FIG. 9C to bring the first wheels 22 into contact with the step surface Su1 of the first step and a wall surface Sw2 of the second step. Note that, FIG. 9B to FIG. 9G will be described later in detail.

Whether there are stairs is detected by, for example, a step detection sensor that detects a step using, for example, infrared light and that is provided on the main body portion 10. Alternatively, the contact of the first wheels 22 with the wall surface Sw2 of the second step may be detected by, for example, a pressure sensor or a vehicle speed sensor provided at the axle 22a of each first wheel 22, instead of the step detection sensor. Further alternatively, the contact of the first wheels 22 with the wall surface Sw2 may be detected on the basis of the difference between a command value for each first motor 41 and the rotation angle of the first motor 41.

On the other hand, when it is determined that the control by the travelling control unit 72 is not being executed (NO in S1), or after the process in S3 or S4 is executed, the switching unit 71 determines whether the control by the standing control unit 73 is being executed (S11). When it is determined that the control by the standing control unit 73 is being executed (YES in S11), the switching unit 71 determines whether the revolving wheels have been landed on the next step surface Su2, as illustrated in FIG. 9C to FIG. 9G (S12).

When it is determined that the revolving wheels have not been landed on the next step surface Su2 (NO in S12), the switching unit 71 continues the control by the standing control unit 73 (S13). On the other hand, when it is determined that the revolving wheels have been landed on the next step surface Su2 (YES in S12), the switching unit 71 determines whether the stair climbing vehicle 1 is climbing the stairs (S14). When it is determined that the stair climbing vehicle 1 is climbing the stairs (YES in S14), the switching unit 71 continues the control by the standing control unit 73. On the other hand, when it is determined the stair climbing vehicle 1 has finished climbing the stairs (NO in S14), the switching unit 71 makes switchover to the control by the travelling control unit 72 (S15).

Figure 8:
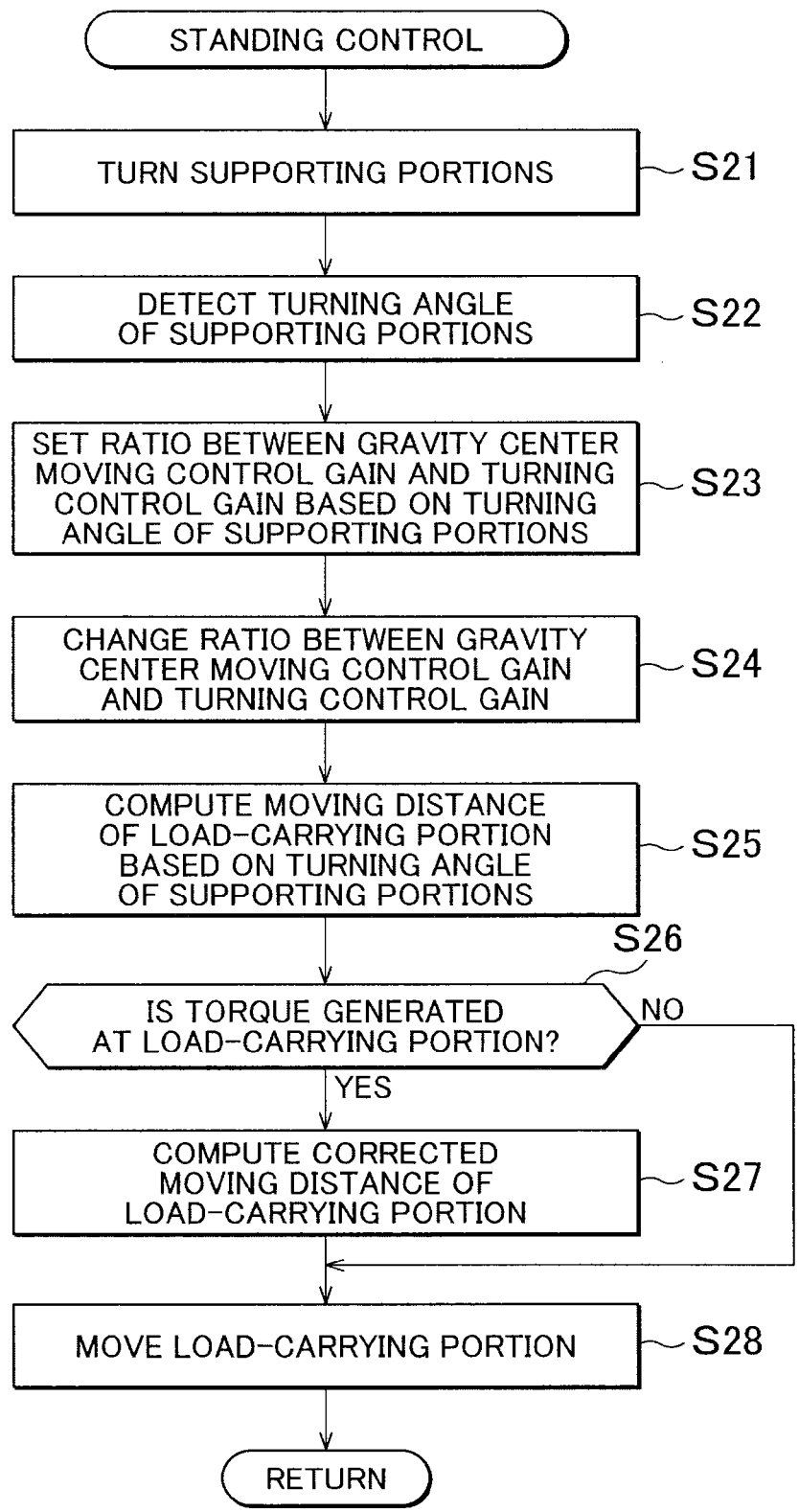
FIG. 8 is a flowchart illustrating a process executed by the standing control unit in FIG. 6.

Next, the standing control executed by the standing control unit 73 will be described. As illustrated in FIG. 8, the standing control unit 73 turns the supporting portions 21 with respect to the main body portion 10 (S21), and detects the turning angle of the supporting portions 21 (S22). Then, the standing control unit 73 sets the ratio between the gravity center moving control gain and the turning control gain based on the detected turning angle of the supporting portions 21 (S23). The sum of the gravity center moving control gain and the turning control gain is one. The turning control gain is obtained based on a function related to the absolute value of the turning angle of the supporting portions 21 with respect to the main body portion 10. The gravity center moving control gain is a value obtained by subtracting the turning control gain from one.

The standing control unit 73 changes the present gravity center moving control gain and the present turning control gain to the gravity center moving control gain and the turning control gain set in S23 (S24). Then, the standing control unit 73 computes a moving distance of the chair 32 of the load-carrying portion 30 based on the detected turning angle of the supporting portions 21 (S25). The moving distance of the chair 32 is obtained based on a function (which is different from the function for obtaining the turning control gain) related to the absolute value of the turning angle of the supporting portions 21 with respect to the main body portion 10. Thus, the position of the chair 32 with respect to the main body portion 10 can be changed with a change in the turning position of the supporting portions 21 with respect to the main body portion 10. Thus, the stair climbing vehicle 1 is able to stably climb up the stairs.

Then, the standing control unit 73 determines whether a torque is generated at the chair 32 (S26). When the torque is generated at the chair 32 (YES in S26), the standing control unit 73 computes a corrected moving distance of the chair 32 of the load-carrying portion 30 (S27). The corrected moving distance of the chair 32 is obtained by multiplying the moving distance of the chair 32 obtained in S25 by a prescribed coefficient (which increases as the value indicated by the sensor signal from the posture detection sensor 92 increases). The corrected moving distance is a moving distance for moving the chair 32 toward the wall surface of the step.

The standing control unit 73 moves the chair 32 with respect to the origin position of the chair 32 of the load-carrying portion 30 by the moving distance of the chair 32 obtained in S25, or moves the chair 32 by a moving distance that is obtained by adding the corrected moving distance of the chair 32 obtained in S27 to the moving distance of the chair 32 obtained in S25 (S28). Next, the above-described processes from S21 are repeated until the stair climbing vehicle 1 finishes climbing the stairs.

Next, the stair climbing operation of the stair climbing vehicle 1, which is executed by the standing control unit 73, will be described. First, as illustrated in FIG. 9B, the standing control unit 73 controls the rotations of each first motor 41 and each second motor 51 to turn the supporting portions 21 with respect to the main body portion 10 counterclockwise in FIG. 9B from the state where the supporting portions 21 are parallel to the travelling surface Sd (the turning angle of the supporting portions 21 at this time is zero degrees) to a turning angle θ1 while maintaining the main body portion 10 in the vertical state. That is, the first wheels 22 revolve around the axles 23a of the second wheels 23 to be lifted up to the step height.

In the standing control, the ratio between the gravity center moving control gain and the turning control gain is changed from the ratio of 1:0 at the time of travelling control (at time t1 in FIG. 10) to the ratio of 0.1:0.9 (at time t2 in FIG. 10) based on a change in the turning angle of the supporting portions 21, and the rotation of each first motor 41 is controlled. Further, the rotation of the moving motor 61 is controlled to move the chair 32 in a direction away from the wall surface Sw1 of the first step irrespective of the turning angle of the supporting portions 21 (hereinafter, referred to as "rearward direction"). The resultant center of gravity G at this time is moved from the position on the vertical line Lv extending from the support shaft $C_{21}$ to a position on a vertical line Lr extending from the axles 23a of the second wheels 23. Because the resultant center of gravity G moves in the rearward direction while the first wheels 22 are lifted up, there is a possibility that the stair climbing vehicle 1 will move rearward. However, the ratio of the turning control gain is set higher than the ratio of the gravity center moving control gain. Thus, it is possible to prevent the stair climbing vehicle 1 from moving rearward.

Figure 9D:
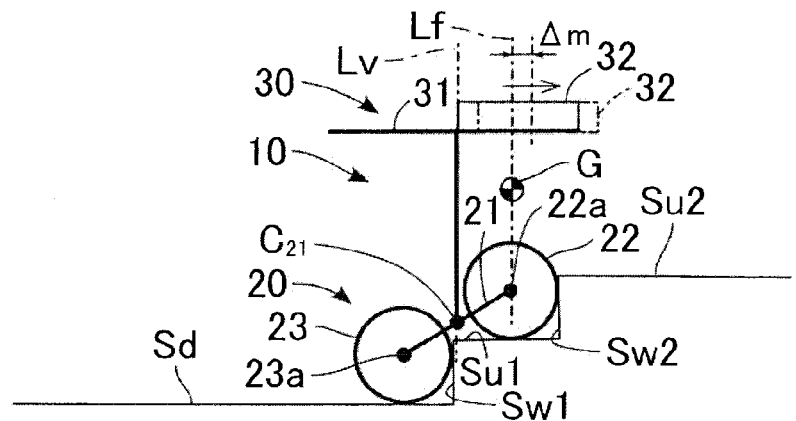
FIG. 9D is a view illustrating a state achieved next to the state in FIG. 9C, and illustrating a state where the load-carrying portion (the resultant center of gravity) is moved forward.

Next, as illustrated in FIG. 9C, the standing control unit 73 controls the rotations of each first motor 41 and each second motor 51 to move the stair climbing vehicle 1 forward while maintaining the state in FIG. 9B to bring the first wheels 22 into contact with the step surface Su1 of the first step and the wall surface Sw2 of the second step. Then, the standing control unit 73 controls the rotation of the moving motor 61 to move the chair 32 forward toward the moved position obtained based on the turning angle θ1 of the supporting portions 21 (in the present embodiment, the position at which the resultant center of gravity G is located on a vertical line Lf extending from the axles 22a of the first wheels 22, as illustrated in FIG. 9D). When the moving chair 32 passes the vertical line Lv extending from the support shaft $C_{21}$, the standing control unit 73 changes the ratio between the gravity center moving control gain and the turning control gain from the ratio of 0.1:0.9 to the ratio of 0.5:0.5 (time t3 in FIG. 10), and controls the rotation of each first motor 41. The resultant center of gravity G moves to the center while the first wheels 22 and the second wheels 23 are landed on the steps. Thus, there is no possibility that the stair climbing vehicle 1 will move rearward, and the stair climbing vehicle 1 is able to keep its balance by setting the ratio between the gravity center moving control gain and the turning control gain to the ratio of 0.5:0.5.

Figure 10:
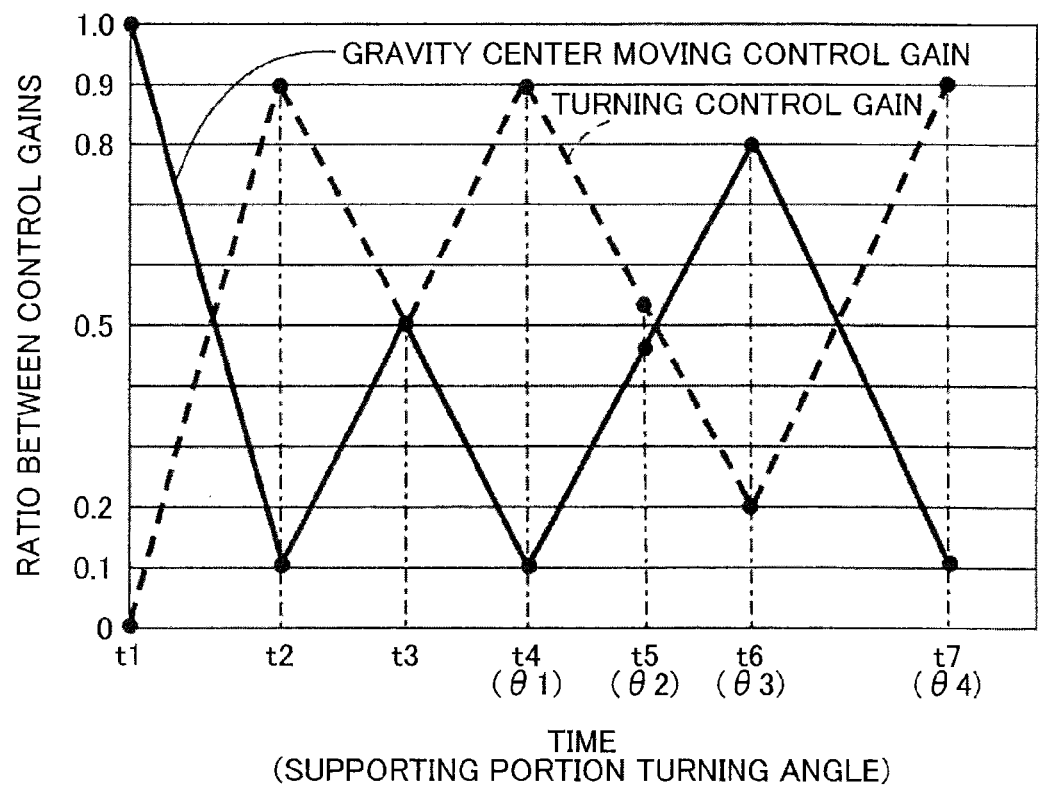
FIG. 10 is a view illustrating a temporal change in the ratio between a control gain of gravity center moving control and a control gain of turning control when the stair climbing vehicle climbs up the stairs.

Next, as illustrated in FIG. 9D, when the chair 32 is moved to the moved portion obtained based on the turning angle θ1 of the supporting portions 21 (in the present embodiment, the position at which the resultant center of gravity G is located on the vertical line Lf extending from the axles 22a of the first wheels 22), the standing control unit 73 changes the ratio between the gravity center moving control gain and the turning control gain from the ratio of 0.5:0.5 to the ratio of 0.1:0.9 (time t4 in FIG. 10). However, when the sensor signal from each posture detection sensor 92 is detected, the chair 32 is moved in a direction toward the wall surface Sw1 of the first step (hereinafter, referred to as "the forward direction") by a corrected moving distance Δm. Because, the resultant center of gravity G is moved in the forward direction, there is a possibility that the stair climbing vehicle 1 will move forward. However, the ratio of the turning control gain is set higher than the ratio of the gravity center moving control gain. Thus, it is possible to prevent the stair climbing vehicle 1 from moving forward.

Figure 9E:
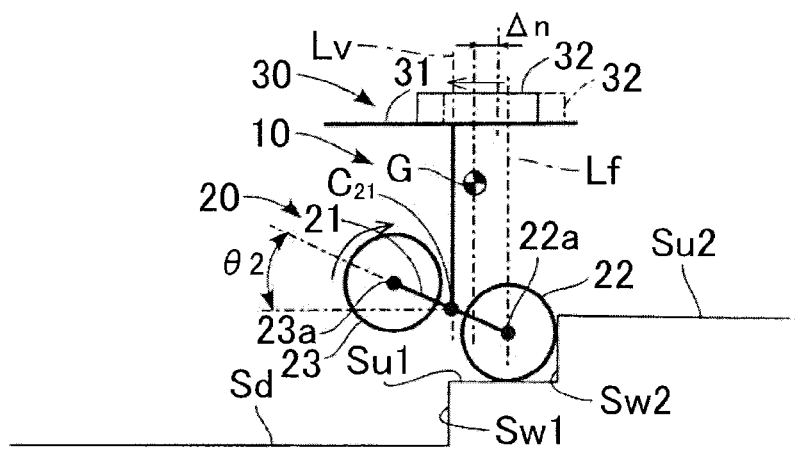
FIG. 9E is a view illustrating a state achieved next to the state in FIG. 9D, and illustrating a state where rear wheels are lifted up from the travelling surface and start revolving.

Next, as illustrated in FIG. 9E, the standing control unit 73 controls the rotations of each first motor 41 and each second motor 51 to turn the supporting portions 21 clockwise in FIG. 9E with respect to the main body portion 10 while maintaining the main body portion 10 in the vertical state. That is, the second wheels 23 revolve around the axles 22a of the first wheels 22.

In the standing control, the ratio between the gravity center moving control gain and the turning control gain is changed from the ratio of 0.1:0.9 based on a change in the turning angle of the supporting portions 21, that is, the ratio of the gravity center moving control gain is gradually increased (the ratio of the turning control gain is gradually decreased), and the rotation of each first motor 41 is controlled. Further, the rotation of the moving motor 61 is controlled based on a change in the turning angle of the supporting portions 21 to move the chair 32 rearward. At this time, when the supporting portions 21 are turned from the state where the turning angle is zero degrees to an angle θ2 (time t5 in FIG. 10), the resultant center of gravity G is located between the position on the vertical line Lf extending from the axles 22a of the first wheels 22 and the position on the vertical line Lv extending from the support shaft $C_{21}$. However, when the sensor signal from each posture detection sensor 92 is detected, the chair 32 is moved forward by a corrected moving distance Δn. Because the resultant center of gravity G is moved rearward while the second wheels 23 are lifted up, there is a possibility that the stair climbing vehicle 1 will lose its balance. However, the ratio of the gravity center moving control gain is set higher than the ratio of the turning control gain. Thus, it is possible to stably keep the balance of the stair climbing vehicle 1.

Figure 9F:
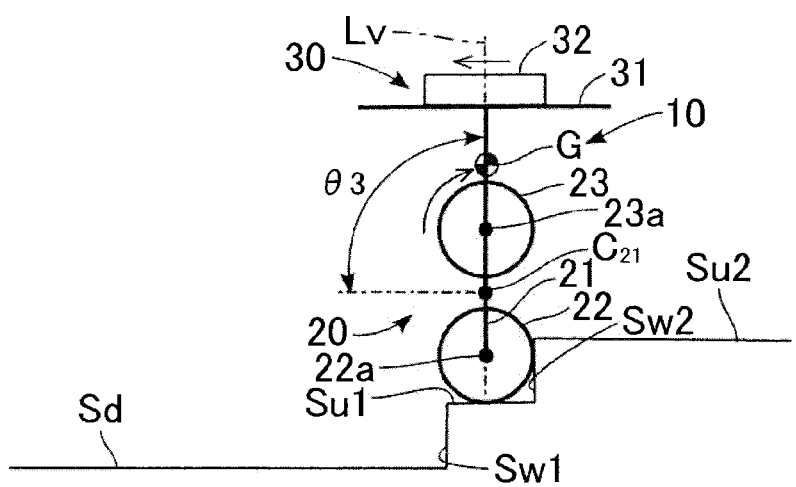
FIG. 9F is a view illustrating a state achieved next to the state in FIG. 9E, and illustrating a state where the load-carrying portion (the resultant center of gravity) is moved to the center and the revolving wheels have reached the top dead center.

Next, as illustrated in FIG. 9F, the standing control unit 73 continues the control illustrated in FIG. 9E to turn the second wheels 23, which serve as the revolving wheels, to the top dead center, thereby placing the supporting portions 21 in the vertical state. Further, the standing control unit 73 controls the rotation of the moving motor 61 to move the chair 32 to the moved position obtained based on the turning angle θ3 (90 degrees) of the supporting portions 21 (in the present embodiment, the position at which the resultant center of gravity G is located on the vertical line Lv extending from the support shaft $C_{21}$). However, when the sensor signal from each posture detection sensor 92 is detected, the chair 32 is moved forward by the obtained corrected moving distance. At this time, the ratio between the gravity center moving control gain and the turning control gain is changed to the ratio of 0.8:0.2 (time t6 in FIG. 10). The first wheels 22, the second wheels 23, the supporting portions 21 and the load-carrying portion 30 are all located on the vertical line Lv extending from the support shaft $C_{21}$ and the resultant center of gravity G moves to the center. Therefore, there is a possibility that the stair climbing vehicle 1 will lose its balance. However, the ratio of the gravity center moving control gain is set higher than the ratio of the turning control gain. Thus, it is possible to keep the balance of the stair climbing vehicle 1.

Figure 9G:
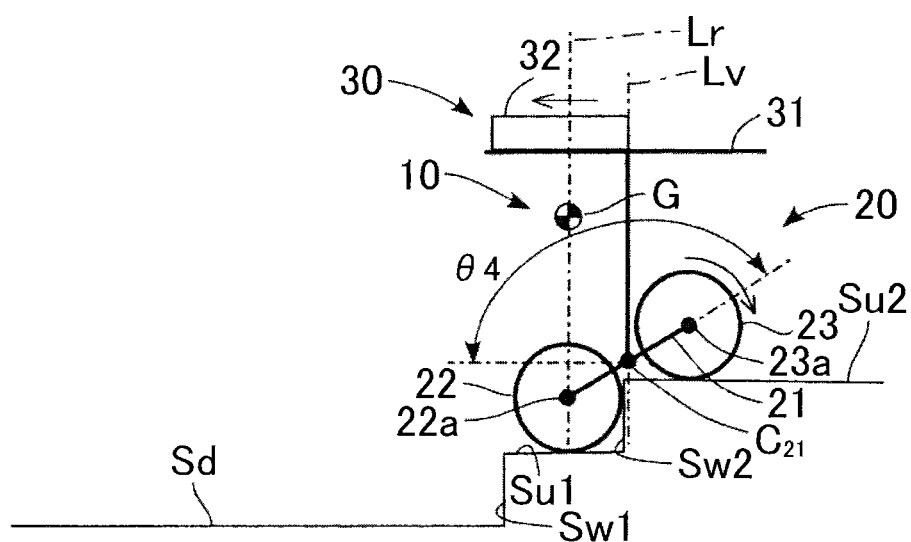
FIG. 9G is a view illustrating a state achieved next to the state in FIG. 9F, and illustrating a state where the load-carrying portion (the resultant center of gravity) is moved rearward and the revolving wheels are landed on the step surface of the second step.

Next, as illustrated in FIG. 9G, the standing control unit 73 continues the control illustrated in FIG. 9F to bring the second wheels 23, which serve as the revolving wheels, into contact with the step surface Su2 of the second step, and controls the rotation of the moving motor 61 to move the chair 32 to the moved position obtained based on a turning angle θ4 of the supporting portions 21 (in the present embodiment, the position located on a vertical line Lr extending from the axles 22a of the first wheels 22). However, when the sensor signal from each posture detection sensor 92 is detected, the chair 32 is moved forward by the obtained corrected moving distance.

In the standing control, the ratio between the gravity center moving control gain and the turning control gain is changed from the ratio of 0.8:0.2 to the ratio of 0.1:0.9 (time t7 in FIG. 10) based on a change in the turning angle of the supporting portions 21, and the rotation of each first motor 41 is controlled. Because the resultant center of gravity G moves rearward, there is a possibility that the stair climbing vehicle 1 will move rearward. However, the ratio of the turning control gain is set higher than the ratio of the gravity center control gain. Thus, it is possible to prevent the stair climbing vehicle 1 from moving rearward. After this, the operations from FIG. 9C to FIG. 9G are repeated until the stair climbing vehicle 1 finishes climbing the stairs.

Next, the operation of a stair climbing vehicle 1 according to another embodiment of the invention will be described with reference to FIG. 11A and FIG. 11B, which are compared with FIG. 9D. In FIG. 9C and FIG. 9D, the movement of the chair 32 is controlled such that the resultant center of gravity G is moved from the position on the vertical line Lv extending from the support shaft $C_{21}$ to the position on the vertical line Lf extending from the axles 22a of the first wheels 22.

However, when the resultant center of gravity G is moved to the position on the vertical line Lf extending from the axles 22a of the first wheels 22, if the weight of a portion located below the load-carrying portion 30 is larger than the weight of the load-carrying portion 30 and a portion located above the load-carrying portion 30, it is necessary to move the chair 32 to a position forward of the position on the vertical line Lf extending from the axles 22a of the first wheels 22. The load-carrying portion 30 and the portion located above the load-carrying portion 30 are the chair 32 and an occupant or an object on the chair 32. However, if the moving distance of the chair 32 is increased, the gradient of the stairs that the stair climbing vehicle 1 is able to climb up is restricted. To loosen the restriction, it is necessary to make the moved position of the chair 32 higher or to increase the weight of the load-carrying portion 30 and the portion located above the load-carrying portion 30. However, with these methods, there is a possibility that the stair climbing control will be unstable.

Figure 11A:
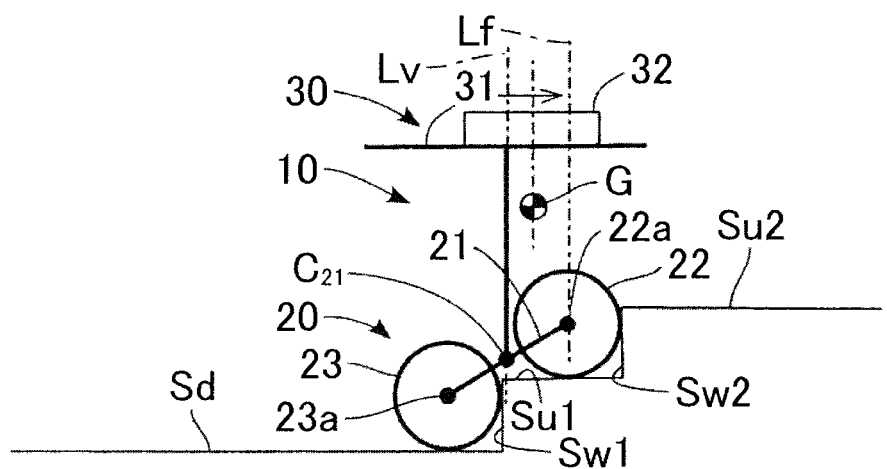
FIG. 11A is a view illustrating a state where a load-carrying portion (the resultant center of gravity) of a stair climbing vehicle according to another embodiment of the invention is moved forward, and illustrating a moving range of the load-carrying portion (the resultant center of gravity) as compared with that in FIG. 9D.

Therefore, as illustrated in FIG. 11A, the movement of the chair 32 is controlled such that the resultant center of gravity G is moved to any position between the position on the vertical line Lv extending from the support shaft $C_{21}$ and the position on the vertical line Lf extending from the axles 22a of the first wheels 22. As a result, the moving distance of the chair 32 is decreased, and thus the range of gradients of stairs that the stair climbing vehicle 1 is able to climb up is broadened. Further, the moving distance of the chair 32 is decreased, and thus it is possible to shorten the stair climbing operation time of the stair climbing vehicle 1.

Figure 11B:
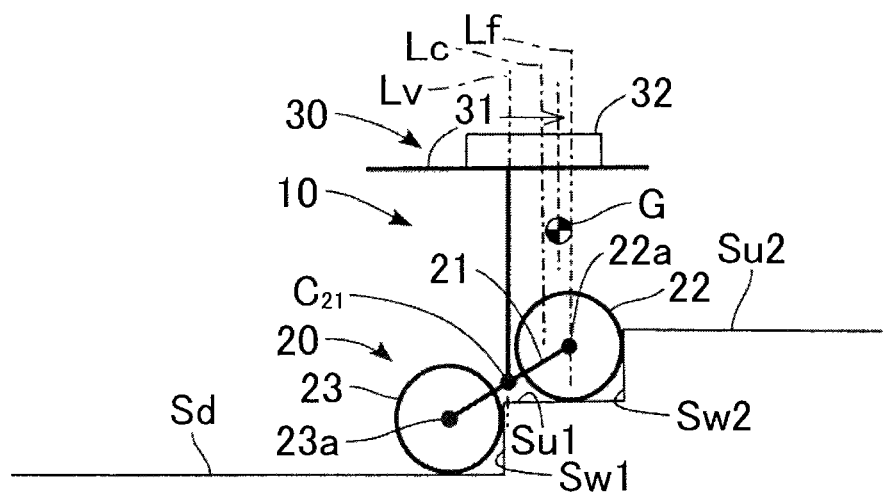
FIG. 11B is a view illustrating a preferable moving range in the moving range of the load-carrying portion (the resultant center of gravity) illustrated in FIG. 11A.

As illustrated in FIG. 11B, the movement of the chair 32 may be controlled such that the resultant center of gravity G is moved to any position between the position on a vertical line Lc located between the position on the vertical line Lv extending from the support shaft $C_{21}$ and the position on the vertical line Lf extending from the axles 22a of the first wheels 22, and the position on the vertical line Lf extending from the axles 22a of the first wheels 22. Thus, a burden placed on the moving actuator 60 is slightly increased. However, the stair climbing vehicle 1 is able to climb up the stairs under stable control.

As described above, the stair climbing vehicle 1 according to the present embodiment is provided with the correction position computing unit 762 that computes the correction position for moving the chair 32 of the load-carrying portion 30 from the basic position toward the fall surface of the step. Thus, when the posture of the load is changed on the chair 32, the position of the chair 32 is changed toward the wall surface of the step. Thus, the center of gravity of the stair climbing vehicle 1 including the load moves in the direction in which the stair climbing vehicle 1 is climbing up the stairs (forward).

Thus, it is possible to provide the occupant with a sense of security, and the stair climbing vehicle 1 is able to climb up the stairs stably.

In order to keep the balance of the stair climbing vehicle 1 when the stair climbing vehicle 1 climbs up the stairs, the ratio between the gravity center moving control gain for the stair climbing vehicle 1 and the turning control gain for the first wheels 22 and the second wheels 23 is changed by controlling the rotation of the first motor 41 of each first turning actuator 40. Thus, when the occupant climbs up the stairs with the use of the stair climbing vehicle 1, the first wheels 22 and the second wheels 23 are slightly turned based on the posture of the occupant seated on the stair climbing vehicle 1. Thus, it is possible to prevent the posture of the occupant from being unstable. As a result, the stair climbing vehicle is able to stably climb up the stairs.

In the above-described embodiments, the stair climbing vehicle 1 provided with the moving actuator 60 that moves the load-carrying portion 30 horizontally has been described. Alternatively, in a stair climbing vehicle according to another embodiment of the invention, a turning actuator (which may function as a changing actuator in the invention) that turns a load-carrying portion in the front-rear direction around a turning shaft provided in a main body portion may be employed instead of the moving actuator 60. Further, the invention may be applied to a case where an occupant climbs down the stairs. Thus, it is possible to stably climb up and down the stairs.

What is claimed is:

1. A stair climbing vehicle, comprising:
a main body portion;
a supporting portion that is disposed at a lower portion of the main body portion and that supports the main body portion, the supporting portion being relatively turnable around a support shaft with respect to the main body portion;
a supporting portion turning angle detection sensor that detects a relative turning angle of the supporting portion with respect to the main body portion;
a first wheel and a second wheel that are supported at the supporting portion so as to be rotatable about respective axles parallel to the support shaft, the first wheel and the second wheel being disposed such that the first wheel and the second wheel are allowed to revolve, at different positions, with respect to the support shaft by turning the supporting portion with respect to the main body portion;
a wheel turning angle sensor that detects a relative turning angle of each of the first wheel and the second wheel with respect to the supporting portion;
a first turning actuator that relatively turns the first wheel and the second wheel, with respect to the supporting portion, around the axle of the first wheel and the axle of the second wheel;
a second turning actuator that turns the main body portion around the support shaft with respect to the supporting portion;
a load-carrying portion that is disposed on an upper portion of the main body portion, and on which a load is placed;
a changing actuator that relatively changes a position of the load-carrying portion with respect to the main body portion;
a controller that drives the changing actuator to change the position of the load-carrying portion with respect to the main body portion and that drives the first and second turning actuators to turn the supporting portion with respect to the main body portion, thereby alternately landing the first wheel and the second wheel on steps of stairs to cause the stair climbing vehicle to climb the stairs; and a sensor that detects a gradient of the main body portion or the load-carrying portion, the controller including
- a gravity center moving control unit that executes feedback control on movement of a center of gravity of the stair climbing vehicle based on a sensor signal from the sensor that detects the gradient,
- a turning control unit that executes feedback control on turning of the first wheel and the second wheel based on a sensor signal from the wheel turning angle sensor, and
- a gain ratio setting unit that sets a ratio between a control gain of the gravity center moving control unit and a control gain of the turning control unit based on a sensor signal from the supporting portion turning angle detection sensor, wherein the controller drives the first turning actuator based on the ratio between the control gains.

2. The stair climbing vehicle according to claim 1, wherein, when the supporting portion is turned from a horizontal state to a vertical state, the gain ratio setting unit sets a ratio of the control gain of the gravity center moving control unit higher than a ratio of the control gain of the turning control unit.

3. The stair climbing vehicle according to claim 1, wherein the changing actuator is a moving actuator that moves the load-carrying portion with respect to the main body portion horizontally between the first wheel side and the second wheel side.

4. The stair climbing vehicle according to claim 2, wherein the changing actuator is a moving actuator that moves the load-carrying portion with respect to the main body portion horizontally between the first wheel side and the second wheel side.

* * * * *